United States Patent
McKenney et al.

[11] 3,774,679
[45] Nov. 27, 1973

[54] TANK

[75] Inventors: John D. McKenney, South Laguna; Thomas R. Rumsey, Inglewood, both of Calif.

[73] Assignee: Royal Industries, Inc., Pasadena, Calif.

[22] Filed: Oct. 12, 1971

[21] Appl. No.: 188,291

[52] U.S. Cl. .............................................. 165/111
[51] Int. Cl. .............................................. F28b 3/00
[58] Field of Search........................ 165/111, 134, 1, 165/182

[56] References Cited
UNITED STATES PATENTS
3,635,287  1/1972  Sprague ............................ 165/134

*Primary Examiner*—Charles Sukalo
*Attorney*—Edward J. Da Rin et al.

[57] ABSTRACT

A tank for conveying a hot, moisturized, pressurized fluid stream constructed for cooling the fluid stream and separating out the moisture. The tank is provided with an internal passageway for conveying the fluid stream therethrough and conveying the fluid stream adjacent the inner wall of the tank in a heat exchange relationship. The tank wall is constructed of a good thermal conductor with the associated fluid passage wall constructed of a good thermal insulator. With the passage of the fluid stream through the tank, the heat is transferred to the outer wall of the tank and radiated to the ambient air by means of fins, or the like.

8 Claims, 3 Drawing Figures

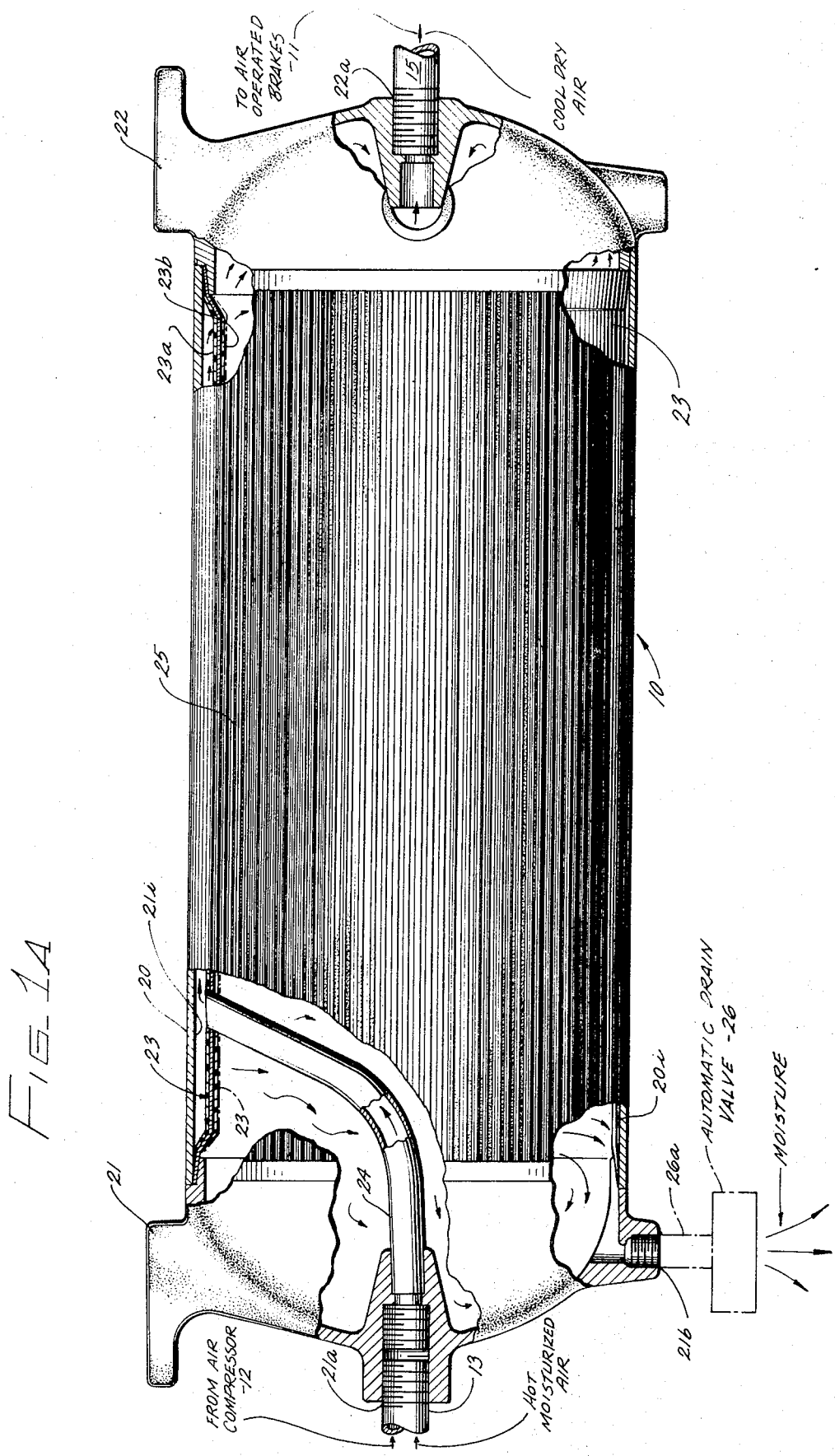

TANK

PRIOR ART AND SUMMARY OF THE INVENTION

This invention relates to a fluid tank and more particularly to a storage tank for pressurized fluids adapted to cool a fluid conveyed thereto and separate out any moisture from the fluid.

When moist air is compressed and then cooled to ambient temperature, the relatively humidity increases. In many practical applications, such as vehicle air brake systems, where operating pressures are approximately 125 pounds per square inch, the compressed air becomes saturated. In such air braking systems, it has been found that water condenses and collects in the cool areas of the system. The accumulation of water in portions of the compressed air system downstream of the storage tank is undesirable. Some of the undesirable effects resulting from the accumulation of water are freezing of water trapped in low spots, partial flow blockage and corrosion.

Some of the prior art systems for drying the compressed air in such vehicle air brake systems utilize a separate heat exchanger between the air compressor and storage tank to cool the air and permit separation of condensed water before storage tank entry. Another common system utilizes two storage tanks, the first one being used as an inefficient heat exchanger and water trap. Other moisture drying systems use chemical absorptives or absorptive dryers upstream of the storage tank.

If the air is cooled to near ambient conditions in the reservoir, the condensed water can be collected and retained at the point where it can be conveniently drained. Undesireable water accumulation in the operating portions of the air system will then be minimized.

The present invention provides a simple and relatively inexpensive tank that combines the storage properties of a conventional fluid or pressurized air storage tank with an effective heat exchanger and moisture collection system. The concept of the present invention allows the exterior surface of the storage tank to be effective as a heat rejection surface so that any stored fluid or air is cooled to the ambient temperature of the exterior of the tank. Such a storage tank may be utilized in pressurized air brake systems presently employed on motor vehicles. The removal of any foreign materials in addition to moisture that may be conveyed in the air stream to the brake actuator such as liquids, oils, ice, etc. allow the brake actuator to operate more reliably than when conventional storage tanks are employed.

From a structural standpoint, the present invention comprises a combination storage and heat exchange tank that is effective for separating out any moisture in the fluid stream conveyed through the tank by cooling the stream during its passage through the tank. For this purpose, the tank may comprise an enclosed cylindrical shell having an integrally secured liner spaced adjacent the inner wall of the shell for defining a fluid passageway between the inner shell wall and the liner extending substantially around the shell inner wall. A fluid conduit is coupled to the fluid entry aperture for the tank for conveying the fluid around the interior wall of the tank and effect the desired heat exchange with the outer sheel during its passage through the tank. In this fashion, any foreign material, water, ice and the like that may be entrained in the fluid stream will be separated out and disposed of at the bottom of the tank where it may be automatically ejected or drained. The liner is preferably constructed of a thermal insulating material while the outer shell is constructed of a thermal conducting material so that the heat of the fluid stream will be rejected towards the outer shell wall. To increase the heat exchange action, the outer shell may be provided with a plurality of heat radiating fins.

These and other features of the present invention may be more fully appreciated when considered in the light of the following specification and drawings, in which:

FIG. 1A is a longitudinal elevational view, with portions broken away, and portions illustrated in cross-section and elevation, of a tank embodying the present invention and an element illustrated in dotted outline.

Figure 2:
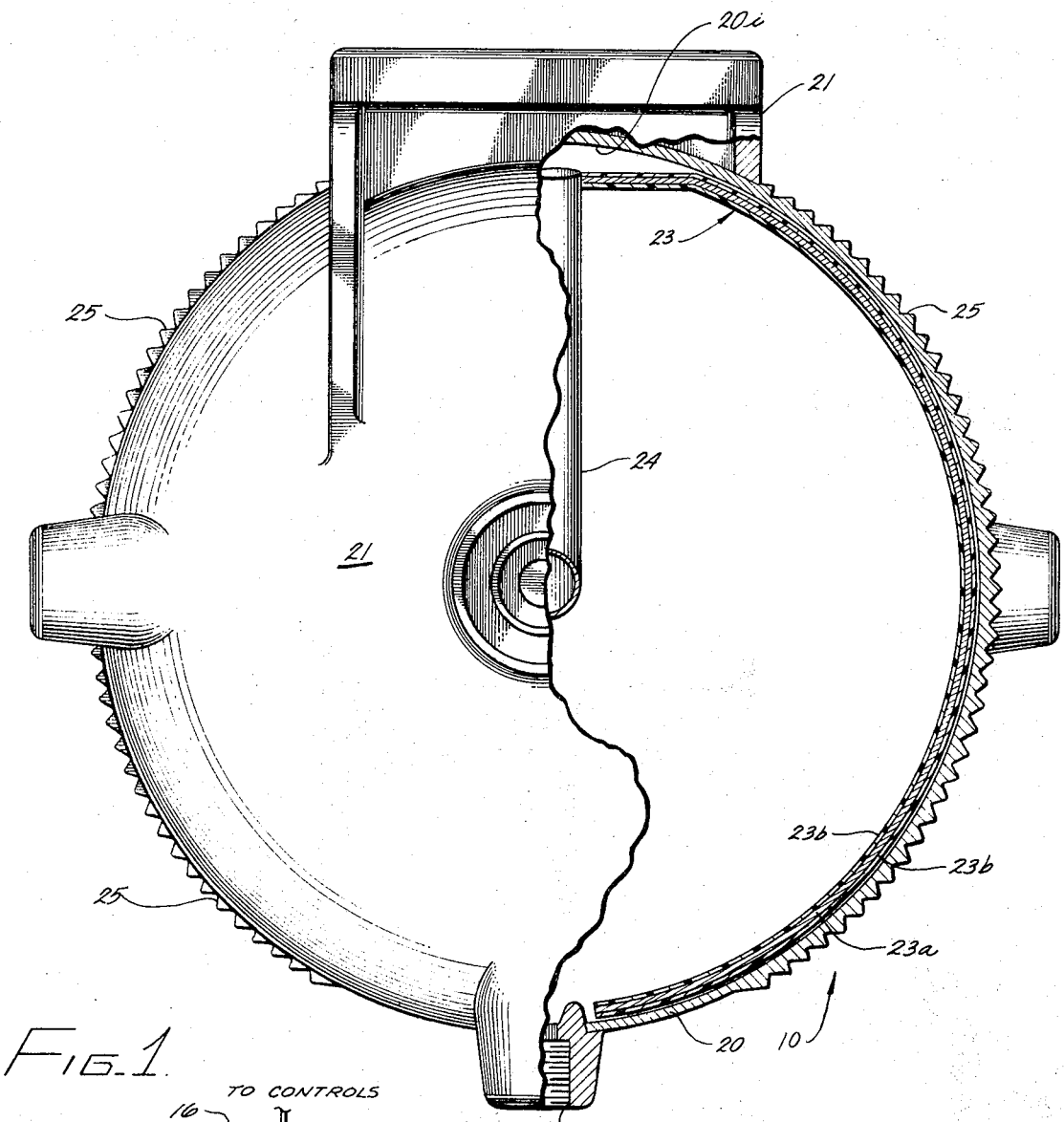
FIG. 2 is a left-hand elevational view of the tank of FIG. 1A with portions broken away and the internal elements illustrated in cross-section and elevation.

The tank of the present invention is adaptable for the storage of various pressurized fluids wherein the pressurized fluid conveyed to the tank is hot and may contain moisture and is to be applied to a utilization system as a cool, dry, pressurized fluid. In a specific example, the tanks may be employed for an air brake system on trucks and trailers in lieu of the present day "wet" tanks.

A conventional air controlled braking system is disclosed in U. S. Pat. No. 3,515,438. The tank of the present invention may be incorporated into such a pressurized air source in accordance with the general piping arrangement illustrated in FIG. 1. For this purpose, the tank 10 embodying the present invention may be considered as the drying tank of the fluid operated system and is connected by means of the dry tank 14 and the conduit 10a to the air operated brakes illustrated as a box 11 in FIG. 1. The drying tank 10 is coupled to receive the fluid or pressurized air conveyed thereto from a conventional compressor 12 which is coupled thereto by means of a conduit 13. The drying tank 10 is coupled to the dry tank 14 by means of the conduit 15. The dry tank 14 is coupled to an emergency tank 16 by means of a conduit 17 having a one-way check valve 18 connected in series between the tanks 10 and 16. The tank 16 may be coupled to the fluid operated controls for the brake system as more specifically disclosed in U. S. Pat. No. 3,515,438. The important aspect of this control system is that the drying tank 10 will receive the hot, pressurized, moisturized air stream from the compressor 12 and apply a cool, dry pressurized air stream to the air operated brakes 11 as is desired.

Figure 1:
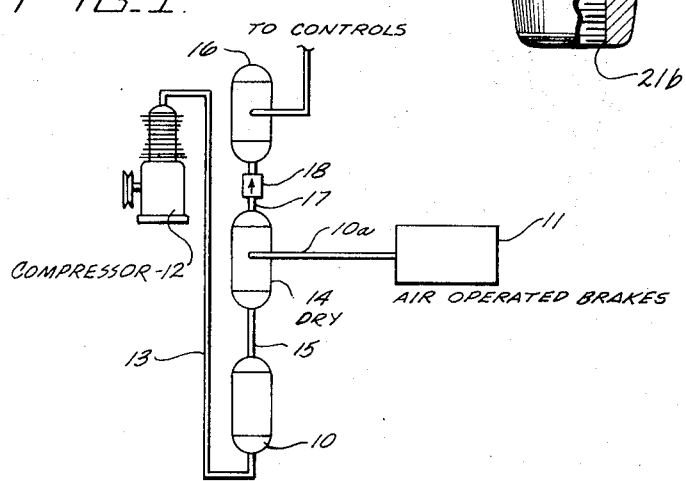
FIG. 1 is a schematic illustration of an arrangement of storage tanks utilized in a conventional motor vehicle braking system illustrating the use of the tank of the present invention in such a conventional braking system.

Now referring to FIGS. 1A and 2, the specific structural organization of the tank 10 may be examined. The tank 10 comprises the cylindrical shell 20 preferably constructed of a material having good thermal conductive properties such as aluminum. The ends of the cylindrical shell 20 are enclosed by a pair of bell heads 21 and 22 secured to the opposite ends of the shell 20. The bell heads 21 and 22 are also preferably constructed of good thermal conductors compatible with the material for the shell 11. In one particular illustrated embodiment of the bell heads 21 and 22, apertures for conveying the pressurized air through the tank 10 are provided. For this purpose, the bell head 21 is considered the entry end of the fluid system and the entry aperture 21A is internally threaded and is illustrated with the conduit or pipe 15 secured thereto for conveying the pressurized fluid into the tank 10 in a system of the type illustrated in FIG. 1.

The tank 10 includes a liner 23 secured adjacent the inner wall 20$^i$ of the shell 20 at the joints between the shell 20 and the bell heads 21 and 22. The liner 23 may be secured at the joints by welding, or the like. The liner 23 is preferably constructed of a thermal insulator for rejecting heat towards the wall 20$^i$. The liner 23 illustrated in FIGS. 1A and 2 comprises a thin, flexible, metallic substrate 23A having insulative plastic coating 23B coated on the opposite sides of the metal substrate 23A. The plastic insulation preferably is a vinyl coating. The liner 23 is constructed and defined to be resilient with respect to any foreign objects such as ice that may be conveyed into the fluid conduit defined between the inner wall 20$^i$ of shell 20 and the liner 23. This resiliency and yieldability is provided so that no obstruction will result in the fluid passageway to prevent or restrict the passage of pressurized fluid or air therethrough. The liner movement is illustrated in FIG. 1A in dotted outline. The pressurized fluid conveyed through the tank 10 is conveyed to the internal passageway through the provision of a fluid conduit 24 coupled to the entry aperture 21A to receive the pressurized air from the conduit 15 and convey it upwardly as illustrated in FIG. 1A for conveyance along the inner passageway described hereinabove. For this purpose, the pressurized fluid will be conveyed into the passageway and circulated around and in contact with the inner wall 20$^i$ of the shell 20 as it is conveyed longitudinally of the tank so as to be expelled or conveyed out of the tank through the exit aperture 22A provided for the exit bell head 22. The exit aperture 22A is defined and substantially similar to the entry end of the tank 10 and has the exit conduit or pipe 10$^a$ coupled thereto. The outer wall of the shell 20 is constructed and defined with a plurality of heat radiating fins 25 extending longitudinally and on opposite sides of the tank 10 as best illustrated in FIG. 2. The fins 25 are good thermal conductors and provide a large surface area for radiating any heat that is derived from the pressurized stream by means of the inner wall 20$^i$ to the ambient air.

The fluid conduit defined with the inner wall 20$^i$ of the shell 20 has a cross-sectional area that is selected to optimize the heat transfer characteristic versus the pressure drop characteristic of the fluid conveyed to the tank 10. To this end the fluid may be conveyed at the rate of 20 or 40 feet per second through the tank 10. These rates of conveyance would provide sufficient velocity to effect the desired heat exchange to the shell 20 without a substantial drop in the pressure of the conveyed fluid. In a pratical embodiment, the space between the inner wall 20$^i$ and the adjacent surface of the liner 23 has been selected on the order of 0.0030 to 0.0040 inch. This spacing would allow a velocity on the order of 40 feet per second through the tank to effect the desired heat exchange and thereby cooling of the fluid. The liner 23 extends essentially around the entire inner wall 20$^i$ of the shell 20 and as best illustrated in FIG. 2 has an open section adjacent the bottom of the tank 10 to allow any moisture, ice or foreign objects to collect along the bottom of the tank. The moisture, then, that is separated from the fluid stream as a result of the separating action afforded by the internal passageway will be collected at the bottom of the tank. For the purpose of draining the moisture collected at the bottom of the tank 10, the entry bell head 21 may be provided with a drain aperture 21$^b$ coupled by means of a conduit 26$^a$ to a commercially available automatic drain valve 26. The automatic drain valve 26 is illustrated in dotted outline and is operative to remove the moisture collected at the bottom of the tank and eject it into the ambient air. It should also be noted that, although the liner 23 is illustrated and described as being a plastic insulative coating that it may be constructed of other materials that have thermal insulative properties and yet sufficiently flexible to allow it to yield to the fluid stream to prevent any restrictions or blockage in the internal passageway. For this purpose, the liner 23 may be constructed completely of plastic such as glass reinforced nylon, polyester, polysulfone, or silicone.

The thermal properties that are important with respect to the liner 23 is that it have a high thermal insulative property relative to the thermal conductive properties of the shell 20 so as to reject any heat in the fluid stream conveyed between the shell wall 20$^i$ and the liner. For this purpose it has been found that a ratio of 2000 to 1 or similar vary large differences is effective for producing the cooling action desired.

From the above, the passage of the fluid stream through the tank 10 should be evident. In summary, it will be noted that the hot, moisturized, pressurized air as it is received from the compressor 12 is conveyed by means of the entry aperture 21$^a$ and the conduit 15 to the internal conduit 24 and delivered adjacent the inner shell wall 20$^i$. This pressurized fluid stream will be conveyed around the internal surface of the shell 20 and progress longitudinally toward the exit bell 22 of the tank 10. In traveling from the entry bell 21 to the exit bell 23, the heat of the fluid stream will be transferred to the outer shell wall and to the fins 25 to be radiated to the ambient air and therefore cools the stream as it travels toward the exit aperture 22$^a$ and the conduit 10$^a$ to the air operated brakes 11. During the interval that the pressurized stream is being cooled, the moisture is separated therefrom and will be deposited at the bottom of the tank and collected at that point. The automatic drain valve 26 or any other similar arrangement will be effective for removing the moisture from the tank and ejecting it into the ambient air. The tank 10 then will couple the cool dry air to the air operated brakes to allow them to operate more efficiently as a result of the provision of such a tank 10 in an air operated system.

What is claimed is:

1. A tank comprising
   an enclosed cylindrical shell,
   a liner internally secured to the shell and spaced adjacent to the inner wall of the shell for defining a fluid passageway between the inner shell wall and the liner extending substantially around the shell inner wall,
   a fluid entry aperture constructed and defined adjacent one end of the shell for conveying a preselected fluid into the shell, a fluid conduit coupled between the fluid entry aperture and the liner for conveying a fluid conveyed to the entry aperture to the fluid passageway defined between the liner and the shell, and a fluid exit aperture constructed and defined on the shell at a point spaced from the entry aperture for allowing the fluid conveyed into the tank and through said defined fluid passageway to exit therethrough.

2. A tank as defined in claim 1 wherein the internal liner has thermal insulating properties for rejecting heat towards the cylindrical shell and the cylindrical shell is constructed of a thermal conductor whereby the thermal path to the shell is better than to the inside of the tank.

3. A tank as defined in claim 2 wherein the outer surface of the shell comprises a plurality of heat radiating fins.

4. A tank as defined in claim 2 wherein the liner is constructed and defined to be yieldable to the fluid and any foreign elements entrained therewith to allow the fluid to pass therethrough.

5. A storage and cooling tank for a pressurized fluid such as pressurized air and the like including an enclosed cylindrical shell constructed of a godd thermal conductor, a liner arranged in a preselected spaced relationship with the inner wall of the shell for defining a fluid passageway therebetween, the liner being constructed and defined to have preselected thermal insulative properties and yieldable in response to the pressure exerted thereon by a fluid stream conveyed thereto, the spacing between the shell wall and the liner being selected to optimize the heat transfer between the fluid conveyed thereto and the shell relative to the fluid pressure drop through the thus defined fluid passageway to cause the heat to be transferred to the shell, means for conveying a hot, pressurized fluid into the cylindrical tank for conveyance through the tank by means of said fluid passageway, and means for conveying the cooled, pressurized fluid received from said fluid passageway out of the cylindrical shell.

a liner arranged in a preselected spaced relationship with the inner wall of the shell for defining a fluid passageway therebetween, the liner being constructed and defined to have preselected thermal insulative properties and yieldable in response to the pressure exerted thereon by a fluid stream conveyed thereto, the spacing between the shell wall and the liner being selected to optimize the heat transfer between the fluid conveyed thereto and the shell relative to the fluid pressure drop through the thus defined fluid passageway, means for conveying a hot, pressurized fluid into the cylindrical tank for conveyance through the tank by means of said fluid passageway, and means for conveying the cooled, pressurized fluid from the cylindrical shell.

6. A storage and cooling tank as defined in claim 5 wherein the tank includes heat transfer means arranged on the outer wall for transferring the fluid heat transferred to the shell to the ambient air.

7. A storage and cooling tank as defined in claim 5 wherein the liner is constructed and defined to cause the fluid conveyed thereby to flow from the top of the tank and then down around the tank and deposit any moisture at the bottom of the tank.

8. A storage and cooling tank as defined in claim 7 including an automatic drain valve coupled to the shell for ejecting any moisture deposted within the shell.

* * * * *

PO-1050
(5/69)

UNITED STATES PATENT OFFICE
CERTIFICATE OF CORRECTION

Patent No. __3,774,679__    Dated __Nov. 27, 1973__

Inventor(s) __John D. McKenney and Thomas R. Rumsey__

It is certified that error appears in the above-identified patent and that said Letters Patent are hereby corrected as shown below:

Column 1, line 34, "Undesireable" should read --Undesirable--; Line 65, "sheel" should read --shell--. Column 5, line 25, "godd" should read --good--. Column 6, line 8 to line 24, delete the following:

"a liner arranged in a preselected spaced relationship with the inner wall of the shell for defining a fluid passageway therebetween, the liner being constructed and defined to have preselected thermal insulative properties and yieldable in response to the pressure exerted thereon by a fluid stream conveyed thereto, the spacing between the shell wall and the liner being selected to optimize the heat transfer between the fluid conveyed thereto and the shell relative to the fluid pressure drop through the thus defined fluid passageway, means for conveying a hot, pressurized fluid into the cylindrical tank for conveyance through the tank by means of said fluid passageway, and means for conveying the cooled, pressurized fluid from the cylindrical shell,"

Signed and sealed this 9th day of April 1974.

(SEAL)
Attest:

EDWARD M. FLETCHER, JR.
Attesting Officer

C. MARSHALL DANN
Commissioner of Patents